United States Patent
MacMillan et al.

[19]

[11] Patent Number: 5,854,886
[45] Date of Patent: *Dec. 29, 1998

[54] METHOD AND SYSTEM FOR PRINTING RASTERIZED DOCUMENTS

[75] Inventors: Leann M. MacMillan, West Linn, Oreg.; Huston W. Rice, Vancouver, Wash.; Bimal Pathak, Camas, Wash.; Mark R. Thackray, Vancouver, Wash.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 626,223

[22] Filed: Mar. 29, 1996

[51] Int. Cl.$^6$ .................................................. G06F 15/00
[52] U.S. Cl. ............................ 395/114; 395/116; 395/108
[58] Field of Search .................................... 395/109, 112, 395/114, 117, 101, 102, 110, 111, 115, 116, 784, 785, 786, 790, 131, 943, 946, 108; 707/522, 523, 524, 528, 908, 911; 345/431

[56] References Cited

U.S. PATENT DOCUMENTS 5,337,258  8/1994  Dennis .............................. 364/551.01
5,642,474  6/1997  Parkhurst et al. ...................... 395/117
5,764,869  6/1998  Bagley et al. ............................ 395/115

FOREIGN PATENT DOCUMENTS

0675428 A1  3/1995  European Pat. Off. .
0726515 A2  2/1996  European Pat. Off. .
WO96/01449A1  6/1995  WIPO .

OTHER PUBLICATIONS

Bertram et al "Print Rasterization Moves Hostward With Support From SCSI" May 1992; pp. 1–4.

Primary Examiner—Edward L. Coles
Assistant Examiner—Dov Popovici

[57] ABSTRACT

Disclosed herein is a method of printing a document image with a host computer and an associated printer, where the printer has a printhead with a plurality of laterally-spaced dot columns. The method includes rasterizing the document image in the host computer to produce raster-formatted data representing the document image. This data is then segregated into data swaths corresponding to swaths of the printhead, and further segregating into dot-column data blocks corresponding to printhead dot columns. The dot-column data blocks are then sent to the printer in the order in which they will be processed by printhead electronics within the printer. The printer passes the dot-column data blocks to the printhead to control firing of printhead's nozzles.

5 Claims, 4 Drawing Sheets

METHOD AND SYSTEM FOR PRINTING RASTERIZED DOCUMENTS

TECHNICAL FIELD

This invention relates to printers, and particularly to printers that print in swaths across an underlying document.

BACKGROUND OF THE INVENTION

Computer printers have typically been designed to accept data using formats and protocols that are independent of printer particularities. Early printers, for example, accepted data in a character-oriented format such as ASCII (American Standard Code for Information Interchange), wherein alpha-numerical symbols were represented respectively by 7 or 8 bit codes.

As printers became more sophisticated, it became desirable to convey graphical information in addition to simple alpha-numerical data. Different protocols have been developed for conveying this information. One such protocol is referred to as PCL (printer control language). PCL was developed by Hewlett-Packard Company for use with its printers. Because of the popularity of these printers, PCL has become a de facto standard. PCL allows a computer to print rasterized graphics on a printer without requiring the computer to have any knowledge of the mechanical particularities of the printer.

FIG. 1 illustrates the architecture of a typical computer system having a host computer 10 and a printer 12. The host computer has a spooler program 14 that accepts print control commands and image data from an application program in a format that is dependent on the operating system of the computer. The spooler program is essentially a data buffer that stores the commands and data in memory until they can be processed more extensively and sent to a printer. Such spooling frees the application program from having to wait for a printer to accept commands and data.

From spooler 14, the control commands and data are sent to a rasterizer 16. The rasterizer converts the image data to a rasterized document image. This document image is usually a bit-map document image, comprising a two-dimensional array of dot intensity or color values.

The rasterized document image is then provided to a PCL encoder 18. The PCL encoder converts the rasterized document image to PCL format, and sends it to printer 12 over an I/O channel. The PCL-formatted image includes both control commands and image data. In most cases, the I/O channel is either a serial or parallel printer interface.

In the printer, a PCL decoder 22 converts the PCL-formatted document image back to some form of rasterized image. The PCL decoder may also perform other operations such as separating color planes and separating control information from actual image data. The actual conversion depends on the particularities of the printer's printing mechanism or printhead.

FIG. 2 illustrates a possible configuration of a single-color printhead 30 having 12 ink-jet nozzles. Each circle in FIG. 2 represents the possible location of an ink dot, relative to the printhead, on an underlying sheet of paper. The shaded circles indicate the positions of nozzles in printhead 30, while the dashed, unshaded circles indicate intervening dot locations on the underlying paper.

The nozzles are arranged in two spaced columns, referred to herein as left and right nozzle columns. In the example shown, the nozzle columns are spaced at an interval of 11 dots.

To print all possible dot locations, the printhead moves laterally across the underlying paper in repeated swaths. Each swath covers twelve rows of dots. At a single printhead location along a swath, the left nozzle column corresponds to column x of the printed document, while the right nozzle column corresponds to dot column x+11. The nozzles of the left nozzle column are positioned vertically over even dot rows on the printed document, while the nozzles of the right nozzle column are positioned vertically over odd dot rows.

To print a swath, the printhead travels across an underlying sheet of paper in increments of one dot. At each incremental position, all of the 12 nozzles are potentially fired simultaneously. The actual firing of each nozzle is of course dependent on the rasterized data sent from the host computer. During a printhead swath, the left nozzle column is used to print even dot rows, while the right nozzle column is used to print odd dot rows.

The printhead, or the circuits driving the printhead, must be supplied with the rasterized data in an appropriately ordered sequence according to the order in which the printhead prints the individual dot locations. Thus, the rasterized data must be segregated into data swaths corresponding to swaths of the printhead. The rasterized data then must be further ordered to account for the spacing of the printhead nozzles. For instance, the data for column x and column x+11 must be grouped together and sent to the printhead controller at or near the same time.

Referring back to FIG. 1, this task of reorganizing the rasterized data is performed by a data formatter 24 within printer 12. Data formatter 24 re-organizes image data before it is sent to a printhead 30 for actual printing, and sends it to printhead electronics as needed.

While the conventional architecture of FIG. 1 has many advantages, one of its disadvantages is that it requires significant microprocessor bandwidth and data memory to sequentially manipulate the incoming image data. Each byte of incoming data must be read, stored, handled several times as it is converted and reorganized for submission to the printhead at appropriate times. It would be desirable to reduce the burdens on the microprocessor, and to thereby reduce the complexity and cost of the microprocessor and related hardware in a printer.

SUMMARY OF THE INVENTION

This invention is a printing system in which the responsibility of formatting the image data for the printhead is assumed by the host computer. Specifically, the host computer produces image data that is segregated into swaths corresponding to swaths of the printer's printhead, and further segregated into dot-columns corresponding to printhead dot columns. The data is then sent to the printer, where it is passed to the printhead without further reformatting. The printer's microprocessor is not required to handle the image data, thereby reducing the required complexity and cost of the microprocessor system within the printer, and increasing the printer performance.

DETAILED DESCRIPTION OF THE PREFERRED EMBODIMENT

Figure 1:
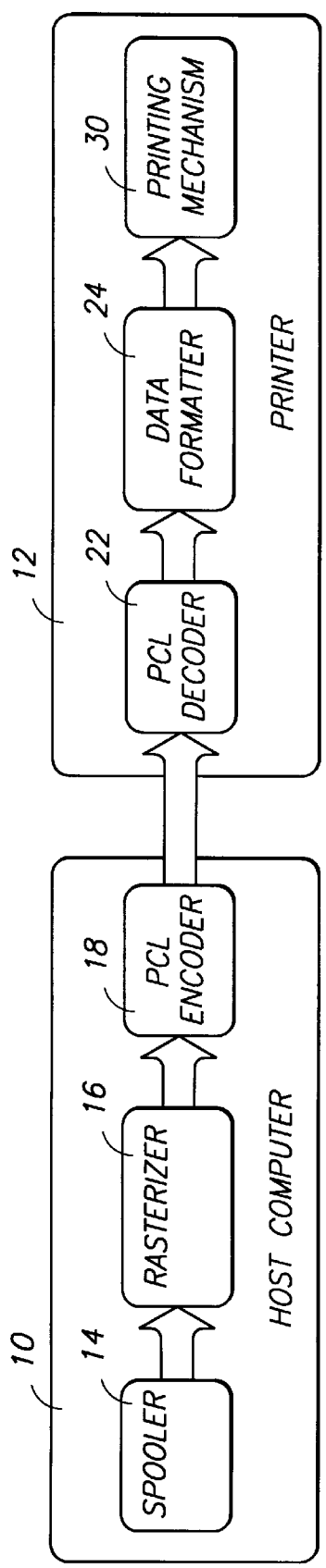
FIG. 1 is a block diagram of a prior art printing system including a host computer and a printer.
Figure 2:
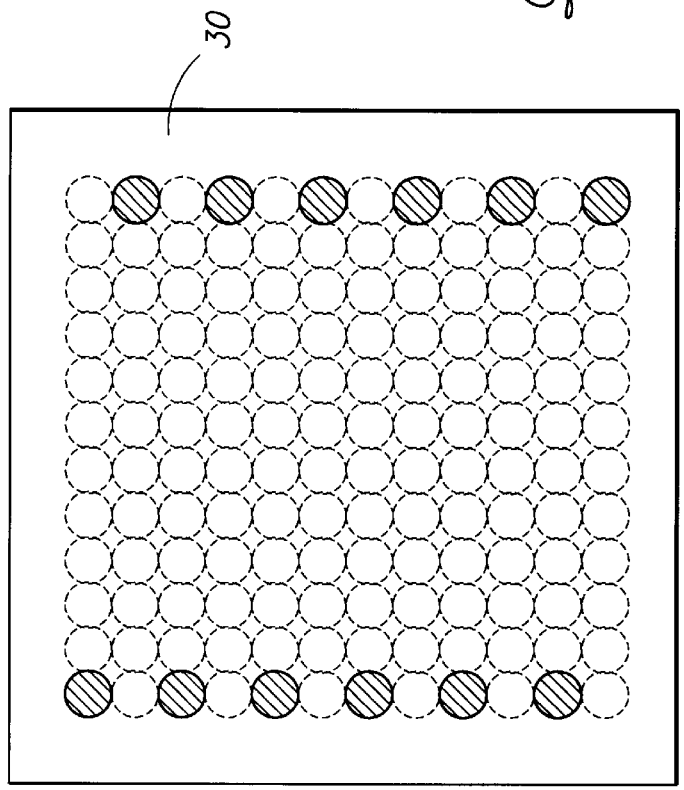
FIG. 2 is a diagram showing nozzle locations in a prior art printhead.

The invention is utilized in a printer having one or more printheads such as described above with reference to FIG. 2. Each printhead has a plurality of nozzle or pin locations, typically organized in two or more laterally-spaced dot or nozzle columns. All the nozzles or pins of the printhead can be fired simultaneously or nearly simultaneously, depending on the details of the image being printed.

The preferred embodiment is a color ink-jet printer. Its printhead has nozzles for printing different colors, such as magenta, cyan, and yellow.

Figure 3:
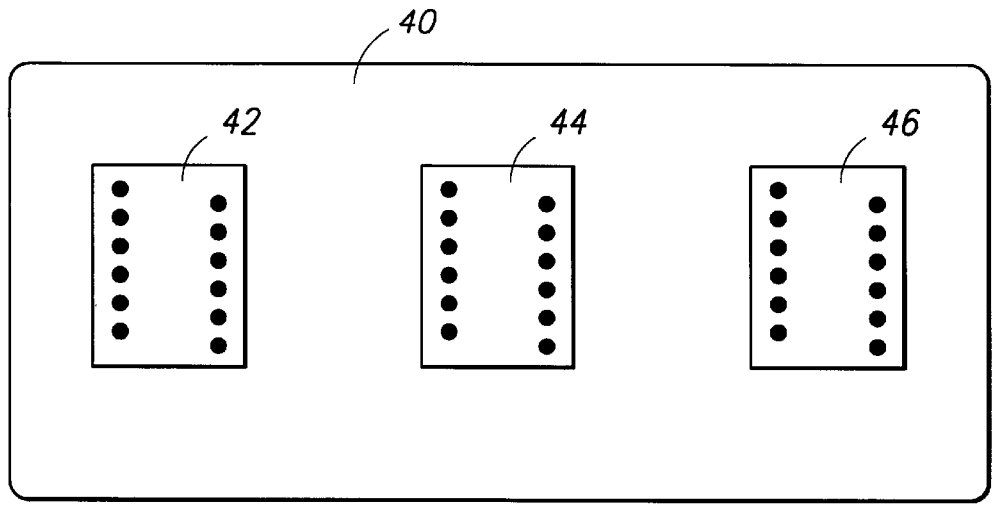
FIG. 3 is a diagram showing nozzle locations in a prior art color printhead that is utilized in the preferred embodiment of the invention.

FIG. 3 shows an exemplary layout of a conventional color printhead 40. Printhead 40 has six laterally spaced nozzle or dot columns that are used to print three colors. The nozzle columns are arranged in pairs, with the nozzle columns of each pair being arranged like those of the single nozzle of FIG. 2—one of the columns is positioned to print even dot rows and the other column is positioned to print odd dot rows. A first pair 42 of the nozzle columns is used to print a first color; a second pair 44 of the nozzle columns is used to print second color; and a third pair 46 of the nozzle columns is used to print a third color. Within each pair, the columns are spaced by an interval of 11 dots.

The pairs of nozzles are mounted together, to move laterally as a unit across an underlying sheet of paper in repeated swaths. The three pairs are spaced from each other by intervals of 23 dots. The nozzles of all of the columns can be fired simultaneously or nearly simultaneously. Each swath prints a pre-defined number of dot rows on the paper. In the example printhead of FIG. 3, each swath is twelve dots high.

Figure 4:
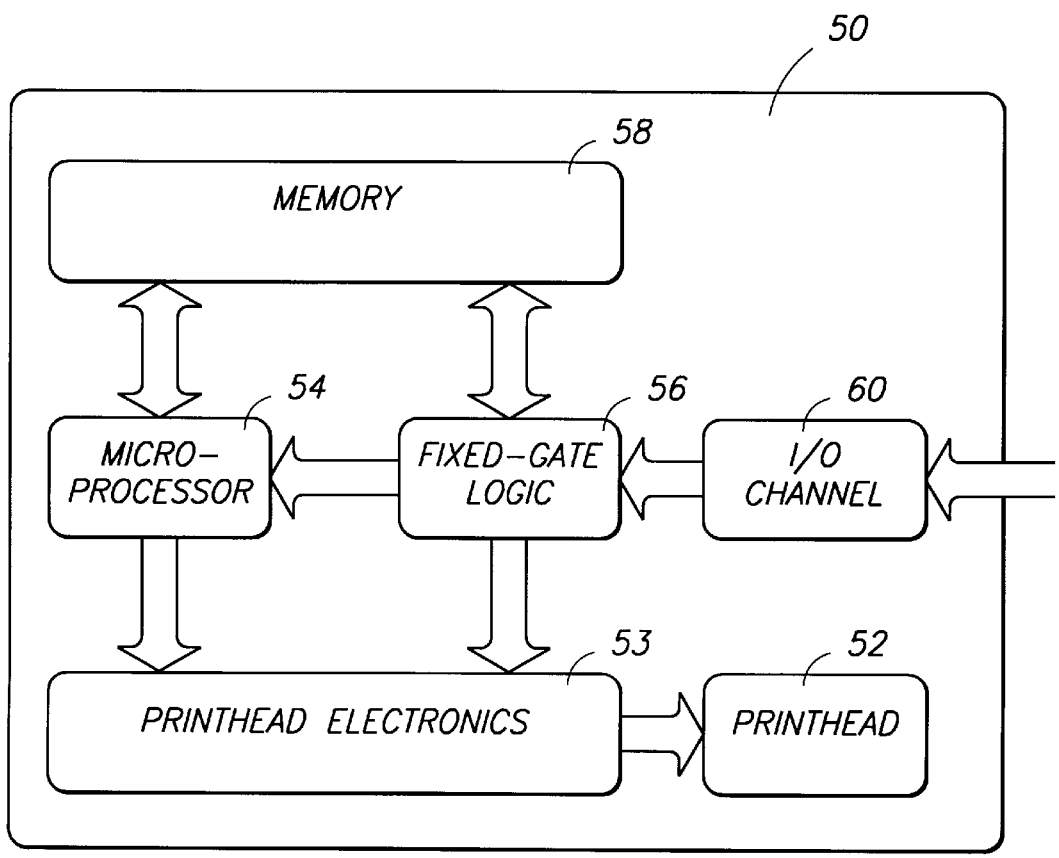
FIG. 4 is a block diagram showing pertinent parts of a printer in accordance with a preferred embodiment of the invention.

FIG. 4 shows pertinent components of a printer 50 in accordance with the invention. Printer 50 is a color ink-jet printer having a printhead 52 configured as described above with reference to FIG. 3. Printer 50 could alternatively be a single-color ink-jet printer, an ink-jet printer with multiple printheads, or a printer using some other type of dot-matrix printing technology such as a dot-matrix impact printer. Printhead 52 has associated printhead electronics 53 that interface between the logic components of printer 50 and the electro-mechanical components of printhead 52. Printhead electronics 53 include, for example, circuits for moving the printhead and for firing individual nozzles. In general, printhead electronics 53 itself does not implement any significant logic functions. Rather, it accepts signals from other components of the printer and translates those signals into signals for driving the various electro-mechanical components of the printhead.

Printer 50 includes a microprocessor 54. Microprocessor 54 is programmable in that it reads and serially executes program instructions from memory. In printer 50, these instructions carry out various control functions in printer 54. The microprocessor is operably connected to printhead electronics 53 for controlling certain printhead functions.

Apart from microprocessor 54, the printer includes fixed-gate logic or logic circuits 56 that perform many of the control functions within the printer. Fixed-gate logic 56 is non-programmable in that it does not read and execute program instructions. In the embodiment described herein, fixed-gate logic 56 is implemented as an application-specific integrated circuit (ASIC).

Both microprocessor 54 and fixed-gate logic 56 are connected to access printhead electronics 53 and an addressable memory array or buffer 58. Memory 58 is preferably dynamic RAM.

Fixed-gate logic 56 is connected to receive instructions and raster-formatted data from a host computer through one or more I/O channels or ports 60, independently of microprocessor 54. I/O channel 60 is a parallel or serial communications port such as used by many printers. When in use, it is connected to receive raster-formatted data from an external source such as the host computer, wherein the raster-formatted data represents a document image that is to be printed. Fixed-gate logic 56 is configured to pass the raster-formatted data to the printhead without processing by microprocessor 54. This is possible because of the way the image data is formatted.

The printer is configured to receive image data that is already formatted in the order in which it will be needed by the printhead as the printhead traverses an underlying document. This formatting is performed by the host computer. Conceptually, a printer driver within the host computer first separates image data into data blocks, wherein each data block corresponds to the dots that will be printed at a particular single position of the printhead. The blocks are then ordered in the same order that the printhead will print the dots as it traverses a document, and sent to the printer along with control information. Upon receiving data formatted in this way, the printer does not need to perform any further formatting or re-ordering. This is a significant advantage over the prior art, greatly reducing the complexity and expense of microprocessor and microprocessor-related components.

Figure 5:
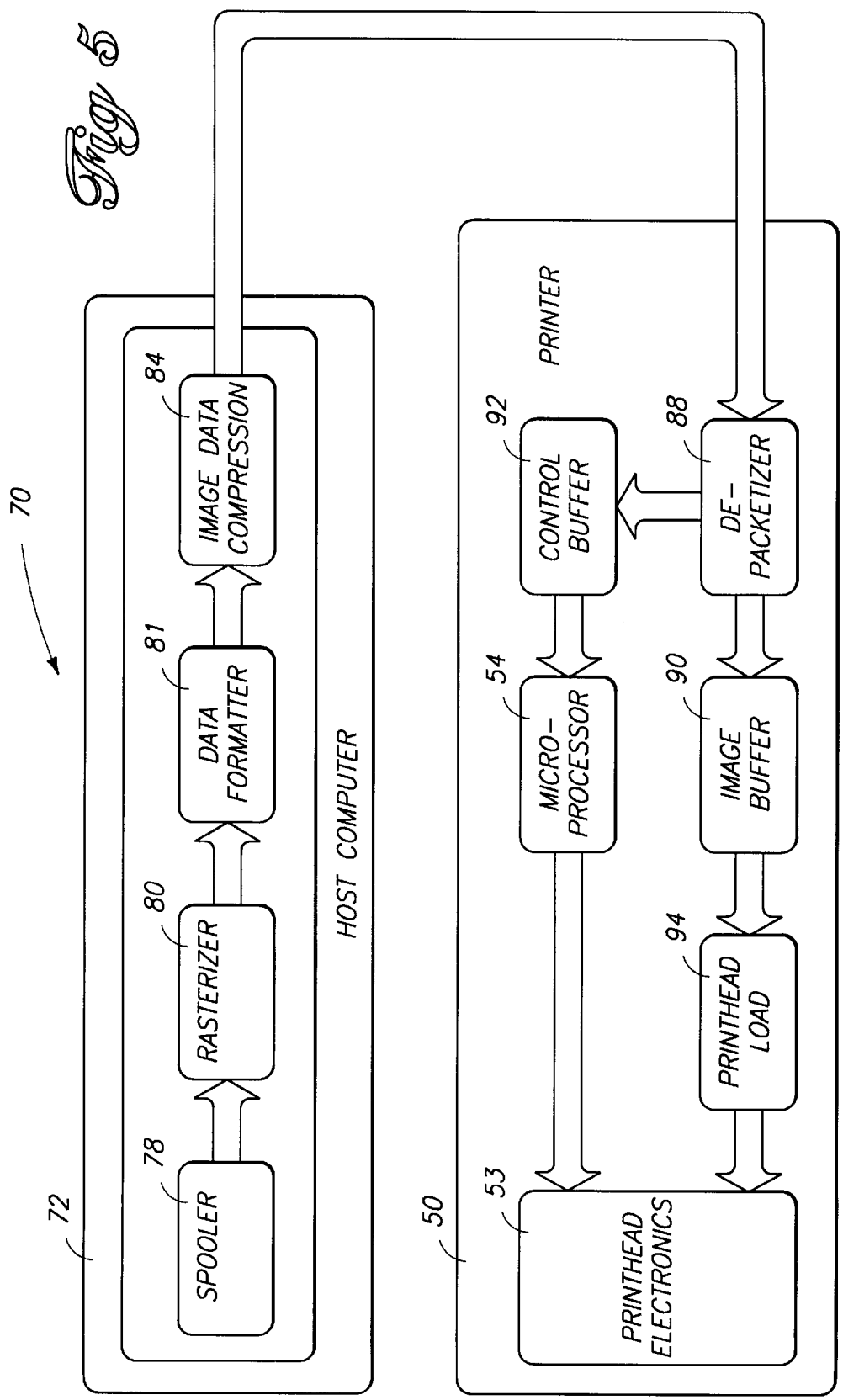
FIG. 5 is a block diagram showing logical components and features of a printing system in accordance with the preferred embodiment of the invention.

FIG. 5 shows a computer and printer system 70 in accordance with the invention. The system includes a host computer 72 such as a conventional personal computer, preferably operating with an operating system that provides for printer drivers. When using an operating system such as this, an application program sends printing instructions to a printer driver associated with or bound to the operating system. The printing instructions are in a format that is dependent on the operating system and independent of any particular printer. The printer driver is chosen during configuration of the operating system to match whatever printer is being used with the computer. The printer driver accepts printing instructions from an application program and converts them to instructions that are appropriate for the particular printer being used.

Host computer 72 has a printer driver 76. Printer driver 76 is implemented as a software module, and is configured specifically for use in conjunction with printer 50. It accepts printing instructions from an application program and converts those instructions to data and commands that are understood by printer 50. The printing instructions relate to a document image that the application program is attempting to print. In accordance with the invention, the printer driver formats image data in a way that is specifically tailored to minimize processing by the associated printer. This includes swath cutting steps and further steps of arranging dot columns within each printhead swath. These steps will be explained more fully below.

Printer driver 76 includes a spooler 78 to receive and buffer printing instructions received from the application program. It also includes a rasterizer 80. Rasterizer 80 accepts the printing instructions and performs a step of rasterizing the document image represented by the printing instructions. This results in a pixel pattern or bit-map image: raster-formatted data indicating intensities or colors for a two-dimensional matrix of pixels or dots. Conceptually, the raster-formatted data comprises a three-plane bit array. For each dot position on a potential printed page, a corresponding position in the array has three data bits indicating whether the cyan, magenta, and yellow nozzles, respectively, should be fired at that dot position. The function of rasterizing the document image might be performed for the document image as a whole, or for incremental portions of the image as required by the following functions.

Printer driver 76 further includes a data formatter 81. Data formatter 81 performs many of the steps that would have formerly been performed within a prior art printer. Specifically, data formatter 81 reorganizes and reorders the document image data into a format that can be passed directly to printhead electronics.

Figure 6:
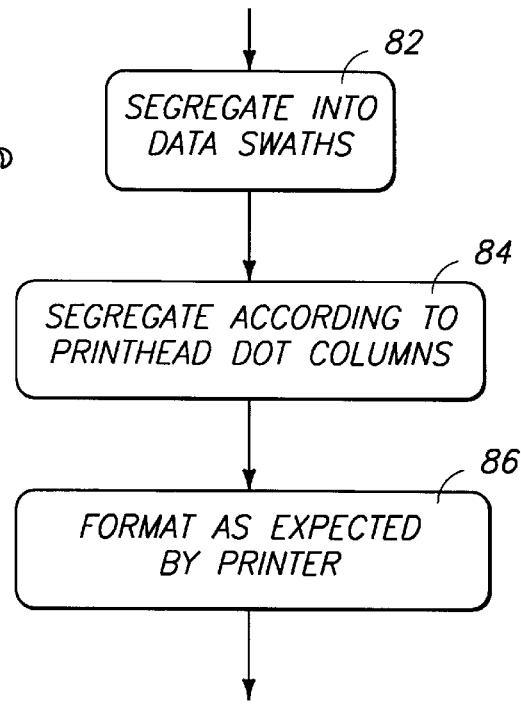
FIG. 6 is a flow chart showing preferred steps performed within a host computer of formatting image data before sending it to a printer.

FIG. 6 shows the steps performed by data formatter 81. A first step 82 comprises segregating the rasterized data into data swaths corresponding to swaths of a printhead on the particular printer which will be used to print the document image. This step, referred to as swath cutting, involves identifying those dot rows that will be printed by printer 50 in a single swath. For a printer using a printhead configured as shown in FIG. 3, a data swath consists of the rasterized data for twelve rows of dots—rows i through i+11, for example (with the rows numbered from top to bottom).

A step 84 comprises further segregating or arranging, within each data swath, the raster-formatted data corresponding to individual printhead dot columns. The data is segregated into dot-column data blocks. Each such block contains the data necessary for controlling the firing of a single column of printhead nozzles at one or more sequential positions of the printhead. A dot-column data block corresponding to the first column x of the printhead at a single position consists of the data for dots (x,i), (x, i+2), (x, i+4), (x, i+6), (x, i+8), and (x, i+10); where dot (a, b) is located at column a and row b. Another dot-column data block, corresponding to the second column of the printhead, consists of the data for dots (x+11, i+1), (x+11, i+3), (x+11, i+5), (x+11, i+7), (x+11, i+9), and (x+11, i+11).

A further step 86 comprises arranging the dot-column data blocks in the particular order in which they are required by the printer. As described more fully below, the printer handles incoming data without any significant reformatting. It includes electronic hardware that expects to receive rasterized data from the host computer in a particular format and order—generally in the same order as the data will be needed by the printhead of printer 50 during traversal of the printhead over the document image. The data is arranged in this format by the printer driver in the host computer, so that the printer hardware receives the data in the order in which the data can be most efficiently used.

In addition to producing rasterized image data that is arranged to be sent directly to a printhead or to the controlling electronics of a printhead, the data formatter produces printer control information to accompany the image data. This control information tells the printer where and how to place the printable image data on the printed page.

After the image data is formatted and ordered as described, it is packetized and then compressed by a compression component 84 (FIG. 5). A number of different techniques, such as run-length encoding, can be used for compression.

Host computer 70 includes an I/O channel (not shown) such as a serial or parallel printer port for sending the compressed raster-formatted image data and the control information to printer 50 once the above functions have been performed.

Within printer 50, image data and commands are handled as shown in the lower part of FIG. 5. The image data and commands are first received at a depacketizer 88. Depacketizer 88 separates the raster-formatted image data from the control information and uses DMA (direct memory access) to store the image data and control information in image and control buffers 90 and 92, respectively. The depacketizer is implemented by circuits within fixed-gate logic 56 (FIG. 4). Buffers 90 and 92 are located in DRAM 58.

Microprocessor 54 retrieves commands or control information from control buffer 92 and in response sets up and initiates various movements within the printer, such as platen advances and printhead carriage movements. Components within fixed-gate logic 56, referred to herein as printhead load components 94, retrieve raster data from image buffer 90, decompress it, and then pass it to the printhead electronics without any significant reformatting. The printhead load components 94 are responsive to printhead movement to provide data to the printhead at appropriate intervals. No further shuffling of data is required at this point, because the image data is arranged by printer driver 76 before the data leaves host computer 72.

In practice, printhead load components 94 utilize further buffers to provide data to the printhead at an adequate rate. Specifically, load components 94 utilize a pair of buffers, referred to as swing buffers, for each nozzle column of printhead 52. These buffers are implemented in high-speed static memory. Each buffer is an array of bits having a depth equal to the number of nozzles in a nozzle column and having an arbitrary width of 8 bits.

Figure 7:
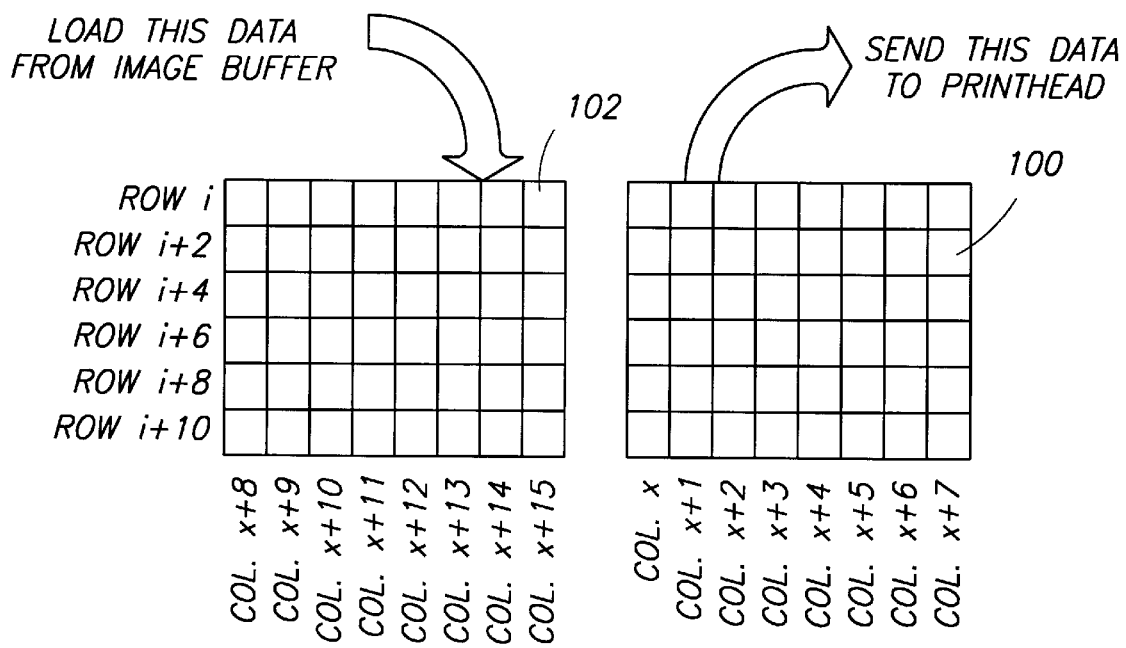
FIG. 7 illustrates a pair of swing buffers as used in the preferred embodiment of the invention.

FIG. 7 shows a pair of swing buffers 100 and 102 for a single column of nozzles (the left-most column of FIG. 3). Each buffer has 6 rows, and each row corresponds to a nozzle in the column of nozzles. Each row of each buffer is eight bits in width, and holds the data for a particular nozzle at eight sequential printhead positions, corresponding to eight sequential dot columns of the document image.

Load components 94 supply data to the printhead from a first swing buffer 100 while loading the second swing buffer 102 from image buffer 90. When all eight bits have been used from the first swing buffer, the roles of the buffers are switched—the first swing buffer is used as a source for printhead data, while the load components load the second swing buffer from dynamic memory. The sequence repeats as image data is transferred from image buffer 90 to the printhead. The same process is implemented in parallel for each nozzle column of the printhead. The printer driver advantageously formats the rasterized data in dot-column data blocks corresponding to the size of the swing buffer, so that they can be transferred directly to a swing buffer by load components 94.

One significant advantage of the printer architecture described herein is that the printer's microprocessor does not have to handle image data. This reduces the printer hardware requirements and hence the cost, and still allows performance equivalent to a PCL printer. In a PCL printer, swath management consumes a significant portion of processor bandwidth. Here, however, the microprocessor is relieved of this burden, allowing the use of a less expensive microprocessor. A PCL printer also requires additional RAM to store intermediate forms of data as the microprocessor decodes the PCL data. Again, this requirement is eliminated by the architecture described above. Similarly, a printer in accordance with the invention requires less ROM, because PCL decode instructions are not needed. A further advantage is that this method of providing data to a printhead eliminates the requirement for font memory in the data path. These advantages translate directly into lower costs.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of printing a document image with a host computer and an associated printer, the printer having a printhead, the method comprising the following steps:

rasterizing the document image in the host computer to produce raster-formatted data representing the document image;

segregating the raster-formatted data into data swaths corresponding to swaths of the printer's printhead;

within each data swath, segregating the raster-formatted data into dot-column data blocks corresponding to printhead dot columns, wherein the printer accesses the dot-column data blocks in a particular order;

the host computer performing the segregating steps;

sending the dot-column data blocks to the printer in the particular order in which they are accessed by the printer; and passing the dot-column data blocks to the printhead in the printer to control firing of the printhead without significantly reformatting the dot-column data blocks within the printer.

2. A method as recited in claim 1 and further comprising the following steps:

compressing the dot-column data blocks before sending it to the printer;

decompressing the dot-column data blocks before passing it to the printhead.

3. A method as recited in claim 1 and further comprising a step of sending printer control information to the printer along with the dot-column data blocks.

4. A method of printing a document image with a host computer and an associated printer, wherein the printer has a printhead with a plurality of laterally-spaced dot columns, the method comprising the following steps:

rasterizing the document image in the host computer to produce raster-formatted data representing the document image;

segregating the raster-formatted data into data swaths corresponding to swaths of the printhead;

within each data swath, further segregating the raster-formatted data into dot-column data blocks corresponding to the printhead dot columns;

sending the dot-column data blocks to the printer in a particular order in which they are accessed by the printer; and executing a printer driver on the host computer, the printer driver performing the rasterizing step and the segregating steps.

5. A method as recited in claim 4 and further comprising a step of sending printer control information to the printer along with the dot-column data blocks.

* * * * *